(12) United States Patent
Krinke, II et al.

(10) Patent No.: US 7,222,349 B1
(45) Date of Patent: May 22, 2007

(54) EXTERNAL DEVICE SUPPORT FOR DEVICE ABSTRACTION LAYER

(75) Inventors: Thomas L. Krinke, II, Hugo, MN (US); Brian E. Boehm, Oakdale, MN (US)

(73) Assignee: Veritas Operating Corporation, Cupertino, CA (US)

( * ) Notice: Subject to any disclaimer, the term of this patent is extended or adjusted under 35 U.S.C. 154(b) by 861 days.

(21) Appl. No.: 10/610,069

(22) Filed: Jun. 30, 2003

(51) Int. Cl.
- *G06F 3/00* (2006.01)
- *G06F 9/44* (2006.01)
- *G06F 9/46* (2006.01)
- *G06F 13/00* (2006.01)

(52) U.S. Cl. .......................... 719/327; 710/8
(58) Field of Classification Search .............. 710/8–10; 719/321–327
See application file for complete search history.

(56) References Cited

U.S. PATENT DOCUMENTS

| | | | |
|---|---|---|---|
| 6,336,152 B1 * | 1/2002 | Richman et al. ................. 710/8 |
| 6,393,341 B1 * | 5/2002 | Lawrence et al. ........... 700/286 |
| 6,708,229 B2 * | 3/2004 | Awasthi et al. ................. 710/8 |
| 6,760,784 B1 | 7/2004 | Bodin et al. |
| 6,792,610 B2 | 9/2004 | Cheon |
| 6,892,381 B2 | 5/2005 | Kim et al. |
| 6,959,439 B1 * | 10/2005 | Boike ........................ 719/326 |
| 7,124,226 B2 * | 10/2006 | Khanna ....................... 710/300 |
| 2002/0004852 A1 | 1/2002 | Sadovsky et al. |
| 2002/0069353 A1 | 6/2002 | Smith |
| 2003/0171846 A1 * | 9/2003 | Murray et al. ............... 700/245 |
| 2003/0233487 A1 | 12/2003 | Ruget et al. |
| 2003/0235211 A1 * | 12/2003 | Thiru et al. .................. 370/469 |

OTHER PUBLICATIONS

Frohlich et al, Integration of Multidimensional Interaction Devices in Real-Time Computer Graphics Applications, Computer Graphics forum, vol. 19, Issue 3, Sep. 2000, p. 313, abstract only.*
Kuester et al, VirtualExplorer: A Plugin-Based Virtual Reality Framework, University of California, 2001, pp. 1-7.*
Barillere et al, Technology Integration in the LHC Experiments Joint Controls Project, 2002, pp. 1-4.*
Baitinger et al, System control structure of the IBM eServer Z900, IBM, vol. 46, Nos. 4/5, 2002.*
"IBM TotalStorage 3583 Tape Library," IBM Corporation, 4 pages, Feb. 2005.
"Scalar 100 Easy Expandability and Enterprise-Class Performance," Advanced Digital Information Corporation, 4 pages, 2004.

* cited by examiner

*Primary Examiner*—William Thomson
*Assistant Examiner*—Diem Ky Cao
(74) *Attorney, Agent, or Firm*—Meyertons Hood Kivlin Kowert & Goetzel, PC; B. Noël Kivlin

(57) ABSTRACT

Various embodiments of systems and methods for providing external device support for a device driver abstraction layer are disclosed. Some embodiments of a method may involve: accessing attribute information associating each of several keys with a respective device attributes, where each of the keys identifies a respective device; and configuring an interface to a device driver for communication with a device dependent on which device attributes the attribute information associates with the key that identifies the device. Configuring the interface may configure the interface to include one or more of interface features. Each of the interface features may support a respective device attribute.

11 Claims, 5 Drawing Sheets

FIG. 1: Prior Art

EXTERNAL DEVICE SUPPORT FOR DEVICE ABSTRACTION LAYER

BACKGROUND

1. Field of the Invention

This invention relates to device drivers and, more particularly, to updating a device abstraction layer to support a new device.

2. Description of the Related Art

Many ISV (Independent Software Vendors) have software products that need to interact with various devices through device drivers. These device drivers are typically specific to a particular OEM (Original Equipment Manufacturer) as well as to a specific operating system platform. If a software product is to be compatible with 10 operating system platforms and devices provided by 10 different OEMs, 100 drivers are needed. Maintaining such a large number of device drivers may itself be difficult. Additionally, updating device drivers each time a new device is released by an OEM may consume a large amount of time, programming resources, and testing resources.

FIG. 1 illustrates the typical process by which a driver is updated to provide compatibility with a new device. A vendor may provide a new device to an ISV that wants to provide support for that new device, as indicated at 11. The ISV may update device driver source code in order to add the device's inquiry string (e.g., a string formed from the devices vendor ID and product ID) to an existing driver so that the device driver recognizes the new device, as shown at 13.

If the device is a rebadge of an already supported device, qualification testing may be skipped, as indicated at 15–17. Otherwise, qualification testing may be performed to see if the device driver operates properly with the new device, as shown at 17. During qualification testing, the device driver source code may again be updated (e.g., to support a special feature implemented by the new device that was not previously supported by the device driver).

Additionally, the driver may need to be regression-tested to ensure that any modifications to the source code have not caused an incompatibility with a previously-supported device, as indicated at 19. If the regression testing fails, as determined at 21, the qualification testing and/or regression testing may be repeated until the regression testing passes. Additionally, the regression testing may be repeated for each operating system with which the driver is operable. If the regression testing passes, the ISV may then release the updated driver to customers, as shown at 23.

Often, a new device has the same or similar functionality as an existing device for which the ISV already provides support. For example, in order reduce the time and effort required to support new devices, a driver may use an external mapping table to map new devices to a particular device type. The driver may handle requests targeting that device according to which device type is associated with that device in the mapping table. In order to provide support for a new device that operates similarly to an already-supported device, the external mapping table may be updated to map the new device to the device type of the already supported device. Accordingly, by providing a new mapping table, support for new devices may be provided without needing to update the actual source code of the driver.

One complication that arises when using a table to determine how to handle a device occurs when a new device does not map to any of the already-supported device types. For example, different vendors often rebadge the same OEM's device. Each vendor may write new firmware for the device, which may lead to hybridized devices that behave differently than devices of the same type and OEM that are released by other vendors. For example, a vendor may write new firmware for a device made by a particular OEM and resell that device with a new vendor ID and product ID. Due to the firmware changes, the rebadged device may behave differently than other devices made by the same OEM. Furthermore, the device may also not behave exactly like any of the vendor's other devices. As a result, no existing device type may adequately match the functionality of the new device, and it may be impossible to provide support for the new device without updating the device driver.

SUMMARY

Various embodiments of systems and methods for providing external device support for a device driver abstraction layer are disclosed. Some embodiments of a method may involve: accessing attribute information associating each of several keys with a respective device's attributes, where each of the keys identifies a respective device; and configuring an interface to a device driver for communication with a device dependent on which device attributes the attribute information associates with the key that identifies the device. Configuring the interface may configure the interface to include one or more interface features. Each of the interface features may support a respective device attribute.

In response to the release of a new device, the attribute information may be updated to include a new key identifying the new device and to associate one or more device attributes with the new key. An interface to a device driver for communication with the new device may be configured dependent on which device attributes the attribute information associates with the new key. The interface to the device driver for the new device may include one or more of the plurality of interface features. These interface features may not have to be updated in response to the release of the new device.

In other embodiments, a method may involve storing on a computer system an attribute file indicating which device attributes are associated with each of several keys. Each of the keys identifies a respective device. A device driver abstraction layer included in the computer system may configure an interface to a device driver for a device dependent on which of the device attributes are associated with the key that identifies that device in the attribute file. The attribute file may be updated to indicate which device attributes are associated with a new key that identifies a new type of device. However, the device driver abstraction layer may not be updated in response to the new type of device. The device driver abstraction layer may configure an interface to a device driver for the new device dependent on which of the device attributes are associated with the new key in the file. The device driver abstraction layer may implement several different interface features. Configuring an interface to a device driver for a device may involve selecting one or more of the interface features to include in the interface dependent on which of the device attributes are associated with the key that identifies that device.

A system may include: a device, a device driver abstraction layer, an attribute file, and a device driver for the device. The device driver abstraction layer may be configured to receive a request to access the device and to responsively configure an interface to the device driver for the device. The device driver abstraction layer may configure the interface to the device driver dependent on which attributes are associated with a key identifying the device in the attribute file. The device driver abstraction layer may configure the interface to include a respective interface feature for each attribute associated with the key in the attribute file.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 2:
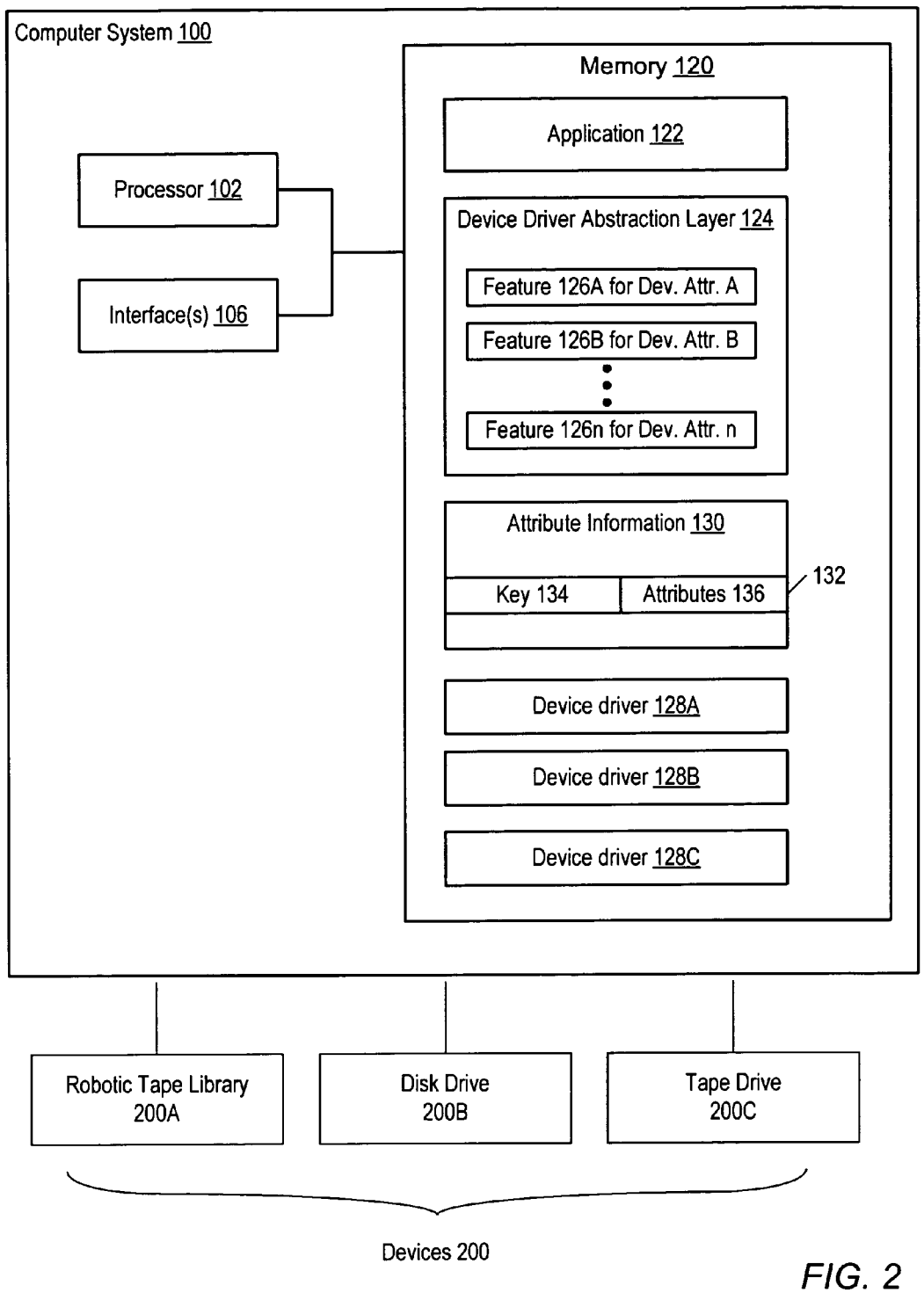
FIG. 2 illustrates a block diagram of a computer system configured to provide external device support for a device abstraction layer, according to one embodiment.

FIG. 2 illustrates an exemplary system that may implement external device support for a device driver abstraction layer. In FIG. 2, a computer system 100 is configured to couple to various types of devices 200 (e.g., through a HBA (Host Bus Adapter)), such as a robotic tape library 200A, a disk drive 200B, and/or a tape drive 200C. Computer system 100 may also be configured to couple to many other types of devices 200.

Computer system 100 includes one or more processors 102, which are configured to execute program instructions stored in memory 120. Computer system 100 also includes one or more interfaces 106, which may couple the computer system 100 to other computer systems or devices 200 via a network such as a LAN (Local Area Network), WAN (Wide Area Network), and/or SAN (Storage Area Network).

Memory 120 stores program instructions implementing an application 122, a device driver abstraction layer 124, and several kernel-level device drivers 128A–128C. In some embodiments, the computer system 100 may include a single device driver 128 to handle a variety of different devices. For example, the computer system may include a single generic SCSI (Small Computer Systems Interface) driver such to handle all SCSI devices. It is noted that throughout this disclosure, drawing elements referred to by the same numeric identifier followed by a unique alphabetic identifier (e.g., device drivers 128A–128C) may be collectively referred to by that numeric identifier alone (e.g., device drivers 128). Note that in alternative embodiments, computer system 100 may include one or more integrated circuits (e.g., FPGAs (Field Programmable Gate Arrays) or ASICs (Application Specific Integrated Circuits)) configured to perform all or part of the functions of application 122, device driver abstraction layer 124, and/or device driver(s) 126. Similarly, computer system 100 may include one or more mechanical devices configured to perform such functions.

In the illustrated embodiment of FIG. 2, memory 120 also stores external attribute information 130. The instructions and/or data implementing application 122, device driver abstraction layer 124, external attribute information 130, and/or device drivers 128A–128C may be paged in and out of memory 120 (e.g., to and from a mass storage device such as a disk drive) during operation of computer system 100.

The device driver abstraction layer 124 may provide an application 122 or other user with a generic interface to a variety of devices, providing a level of abstraction between the different devices' drivers and the application 122 or other user. The application 122 may access devices 200 through the device driver abstraction layer 124. The device driver abstraction layer 124 may in turn generate appropriate commands to one or more kernel-level device drivers 128. In some embodiments, the device drivers 128 may be configured as "pass-through" drivers that receive commands from the abstraction layer 124 and provide a mechanism for transporting those commands to the appropriate device 200. Each device driver 128 may have been specifically provided by an OEM or vendor of a particular device, provided as part of an operating system running on computer system 100, or provided by an ISV that produced the application 122.

The device abstraction layer 124 may be configured to obtain a key 134 identifying each of one or more devices 200 currently coupled to the computer system 100 (e.g., by accessing configuration information associated with those devices 200). A key 134 may include a device inquiry string, which specifies the vendor ID and product ID of the device. A key 134 may also indicate the general type of the device (e.g., tape drive, disk drive, robotic library). Given the key 134 for a particular device, the device abstraction layer 124 may access attribute information 130 to retrieve information identifying one or more device attributes 136 associated with that key 134.

For each of several keys 134, the external attribute information 130 associates that key 134, which identifies a specific device (e.g., as identified by vendor ID and product ID), with one or more device attributes. External attribute information 130 is external to device driver abstraction layer 124 such that external attribute information 130 can be updated without updating the device driver abstraction layer 124. For example, external attribute information 130 may be stored as one or more files of various types (e.g., text, XML (Extensible Markup Language), etc.). These file(s) may be updated independently of one or more executable files implementing the device driver abstraction layer 124.

Unlike updates to the device driver abstraction layer 124, updates to the attribute information 130 may not require any source code updates.

The attribute information 130 may be formatted in various ways. For example, in one embodiment, the attribute information 130 may be formatted such that each line in a file storing the attribute information is treated as a string representing a record. In other embodiments, file(s) storing the attribute information 130 may use a key/sub-key format. Each device's record may include a key containing the device's inquiry string and device type, followed by a list of corresponding device attributes. Attributes that are not present for a particular device may be left out of that device's record. The attribute information 130 may also be organized as a table in some embodiments.

A device attribute 136 indicates a specific behavior or property of a device 200. For example, a device attribute 136 may provide an indication as to whether a device has optional functionality (e.g., the option to be upgraded to include a barcode reader, which reads a barcode label from a tape) as well as an indication as to how to determine whether that optional functionality is currently implemented by that device. Another example of a device attribute may indicate whether a device is a self-cleaning device. Some attributes may specify a particular value of a device property. For example, a device attribute may indicate the number of slots included in a robotic library device.

The device abstraction layer 124 configures an interface to one or more device drivers 128 in order to interact with a particular device 200 based on which attributes 136 are associated with that device's key 134 in attribute information 130. The interface may be configured independently for different attributes. For example, two different keys, each associated with a respective device, may be associated with one of the same attributes by the attribute information 130. Additionally, these two different keys may each be respectively associated with another different attribute. With respect to the common attribute, the device abstraction layer 124 may configure the interface to the device driver 128 to include the same feature for both types of devices. However, the abstraction layer 124 may configure the interface to the device driver 128 to include different features for the two devices with respect to the differing attributes. Thus, the external attribute information 130 may allow different device driver interface features 126 within the device driver abstraction layer 124 to be selected similarly to selecting individual items on a menu.

The device abstraction layer 124's interface to the device drivers 128 for each device may determine what commands the device abstraction layer 124 provides to a device driver 128 for a given input from application 122. The interface for each device, as determined based on the attributes associated with that device's key in the attribute file, may also determine how the device abstraction layer 124 reacts to information received from each device 200. For example, each device vendor may define its own error codes. One or more of the attributes associated with a particular key in the attribute information 130 may indicate which error codes are relevant to a particular device. Based on these attributes, the device driver abstraction layer 124 may configure an interface to a device driver 126 for that device that recognizes the error codes specified in that attribute file 130.

By configuring the interface to the device driver(s) 128 independently for each attribute of the device associated with the device's key in the attribute information 130, various hybrid devices may be handled without updating the device driver abstraction layer 124. The hybrids may include those devices that are rebadges in which the device firmware has been rewritten by the rebadging vendor. For example, the IBM 3583™ is a rebadge of an ADIC Scalar 100™. Unlike a non-rebadged ADIC Scalar 100, however, the firmware of the IBM 3583 may use the IBM rules for recognizing whether the device has a barcode reader installed. To support the IBM 3583, the attribute information 130 may be updated to associate the rebadged device's key 138 with one or more attributes indicating one or more common behaviors and/or properties shared with the ADIC Scalar 100 and another attribute indicating that the device uses IBM rules for recognizing whether a barcode reader is installed. Assuming the appropriate device driver features 126 for each of these attributes are already included in the device driver abstraction layer 124, the rebadged device may be supported without updating the device driver abstraction layer 124.

The device driver abstraction layer 124 may include code to implement each possible feature 126 of the interface to device drivers 128. For example, in the illustrated embodiment, the device driver abstraction layer 124 includes code implementing interface features 126A–126n. Each interface feature 126 may be associated with a respective attribute. Whenever the device driver abstraction layer 124 is communicating with a device having a key that is associated with the respective attribute, the device driver abstraction layer 124 may include that interface feature 126 in the configured interface to a device driver 128 for that device. As the device driver abstraction layer 126 communicates with different types of devices, the device driver abstraction layer 126 may dynamically update the interface, as indicated by the attribute information 130, to have the appropriate interface features 126 for the type of device currently being communicated with. Different attributes may select whether a feature of the device driver interface (e.g., by indicating whether slot-handling features are needed) is to be included and/or provide parameters for use in configuring the interface (e.g., the number of slots included in the device).

It is noted that configuring the device driver interface for a particular device may occur on an as-needed basis. For example, if a particular request is received from the application 122, the device driver abstraction layer 124 may access the attribute information 130 to identify which device driver interface feature is needed to handle that particular request for the targeted device. This process may continue such that the device driver interface is dynamically updated based on what features 126 are needed to handle a particular request for a particular device.

Examples of different features 126 of the device driver interface that may be included in the device driver abstraction layer 124 include: features that determine whether optional components, such as barcode readers, are available and/or installed; features that determine which error codes are generated by the device; features that handle slot-0 based devices; features that are used during automatic self cleaning, and/or features that perform automatic device configuration. Other features may also perform basic communication with a particular type of device (e.g., basic tape drive communication commands).

As new devices that include new combinations of device attributes are released, the attribute information 130 may be updated to link the key for each new device with an appropriate set of device attributes. If the appropriate interface feature 126 for each device attribute associated with a new device is already implemented in device driver abstraction layer 124, updating the attribute information 130 may provide the device driver abstraction layer 124 enough information to successfully configure a device driver interface for the new type of device. Accordingly, through the use of the external attribute information 130, the new device may be supported by the device driver abstraction layer 124 without updating the device driver abstraction layer 124 itself.

If a new device includes a new attribute for which an appropriate device driver interface feature 126 is not already implemented in device driver abstraction layer 124, the device driver abstraction layer 124 may be updated to implement the appropriate device driver interface feature 126. The external attribute information 130 may also be updated to associate the new device's key with the appropriate device attributes, including the previously-unsupported attribute. Subsequent to the update to the device driver abstraction layer 124 to implement the new device driver interface feature, any other new devices that have the same new attribute may be supported by simply updating the external attribute information 130.

Figure 3:
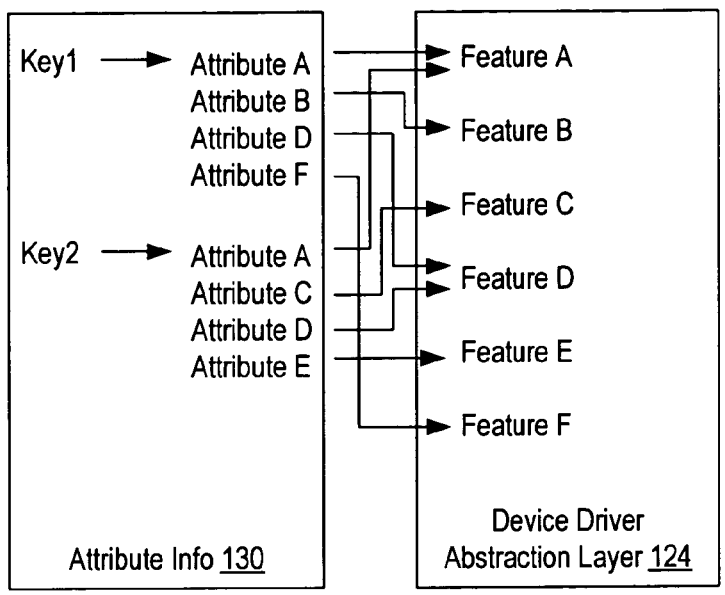
FIG. 3 illustrates how two different keys may each be associated with a different set of attributes, and how each attribute may be associated with a specific feature of an interface to a device driver, according to one embodiment.

FIG. 3 illustrates how two different keys may each be associated with a different set of attributes in attribute information 130, and how each attribute may in turn be associated with a specific feature of an interface to a device driver. In this example, Key1 is associated with device attributes A, B, D, and F by external attribute information 130. Key2 is associated with device attributes A, C, D, and E by external attribute information 130. Key1 may include the vendor ID and product ID of a particular vendor's robotic library. Similarly, Key2 may include the vendor ID and product ID of a different vendor's robotic library. Both robotic libraries may have been manufactured by the same OEM; however, each vendor may have implemented special vendor-specific features and/or written different firmware for that vendor's particular version of the device. Accordingly, both devices may share some attributes while also having different attributes.

Each attribute A–F is associated with a respective device driver interface feature A–F. Thus, if device driver abstraction layer 124 is interacting with a device specified by Key1, the device driver abstraction layer 124 may configure a device driver interface that includes features A, B, D, and/or F (if some device driver interface features are not immediately needed to perform a request, those features may not be configured at that time). In contrast, when the device driver abstraction layer 124 is interacting with a device specified by Key2, the device driver abstraction layer 124 may configure a device driver interface that includes features A, C, D, and/or E. Each feature A–F may be implemented a single time within the device driver abstraction layer 124, and thus the code implementing features A and D may be reused when interfacing to either device.

Figure 4:
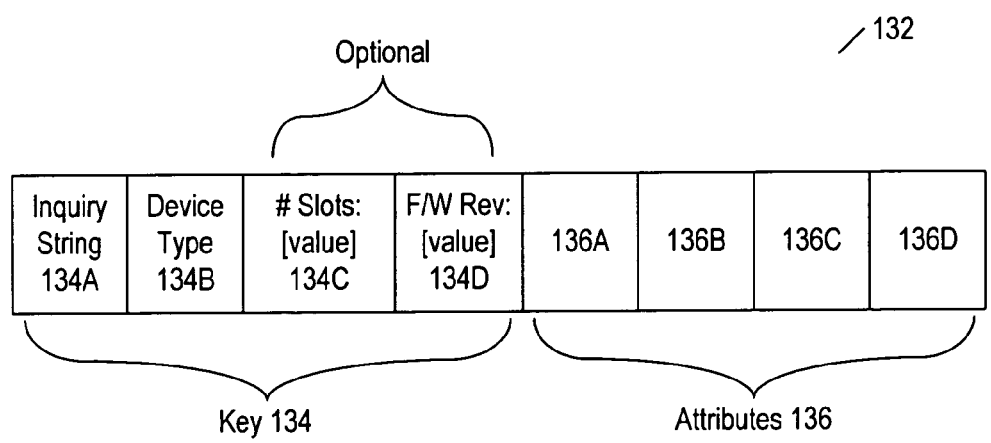
FIG. 4 illustrates an exemplary association that may be maintained by external attribute information 130, according to one embodiment.

FIG. 4 illustrates an exemplary association that may be maintained by external attribute information 130. In this embodiment, the association links a key 134 to a set of device attributes 136A–136D. The key 134 includes an inquiry string 134A, which may include a vendor ID (VID) and a product ID (PID). The key 134 may also include a device type 134B, which may indicate the general category in which the device belongs. For example, the device type 134B may indicate whether the device is a robotic library or a disk drive.

In some embodiments, key 134 may include several optional components. These components may be used to differentiate between devices of the same type, VID, and/or PID but that have different features or components. For example, the firmware revision (F/W Rev) 134D of a device may be used as an optional search criterion when looking a device up in the table. The behavior of a device may change from one firmware revision to the next, and thus different features 136 may be associated with a device dependent on the current firmware revision.

The number of slots 134C (# Slots), mailslots (sometimes called Import/Export or Inport/Outport elements), and/or the number of transports may also be used as an additional search criterion in some embodiments. The number of slots 134C may indicate whether devices having the same VID, PID, and/or type have different components. For example, some autoloaders may typically come with 10 slots and no barcode reader. An optional barcode reader that installs in slot 10 may be available for these autoloaders. When the optional barcode reader is installed, these autoloaders only have nine slots. Thus, the number of slots 134C may indicate whether the device has a barcode reader. This in turn indicates whether barcode-handling features should be implemented in a device driver interface to that device. For example, if the number of slots 134C indicates that the device has a barcode reader, the device driver may be configured to query the device for barcodes (which may generate errors if the device lacks a barcode reader).

The device attributes may include a robotic sub-type attribute 136A, which may have a value indicative of which one of several different robotic sub-types is associated with that key. For example, different robotic sub-types may be assigned based on one or more of the following: the physical characteristics of the robot, the media type commonly used by that class of robots, or the communication methods used by the underlying robotics. The device driver abstraction layer 124 may include different features 126 for each different robotic sub-type. It is noted that, as used herein, a robot is a peripheral device that includes a mechanism for the automated mounting and dismounting of media in tape or optical disk drives. A robot may also be referred to as a library, robotic library, media changer, automated library, jukebox, stacker, or tape stacker.

The device attributes may also include a barcode detection (Barcode Det) attribute 136B indicative of how to detect whether an optional barcode reader is currently installed in the device. This attribute 136B may be used to select which device driver interface feature to use when determining whether the device includes an optional barcode reader. Various additional device attributes 136C and 136D may additionally be included, as desired.

Note that the attributes 136 included in FIG. 4 are merely exemplary. Other embodiments may include different attributes in addition to or instead of the attributes illustrated. Additionally, within a given embodiment, different keys 134 may be associated with different sets of attributes, and each attribute may not be present for each key. Thus, in the embodiment of FIG. 4, another device's key may be associated with attributes 136A, 136B, and 136D, as well as with several other attributes. The shared attributes may have different values specified than those specified for the key of FIG. 4. Accordingly, the external attribute information 130 may associate each key with different sets of and/or values of device attributes.

Figure 5:
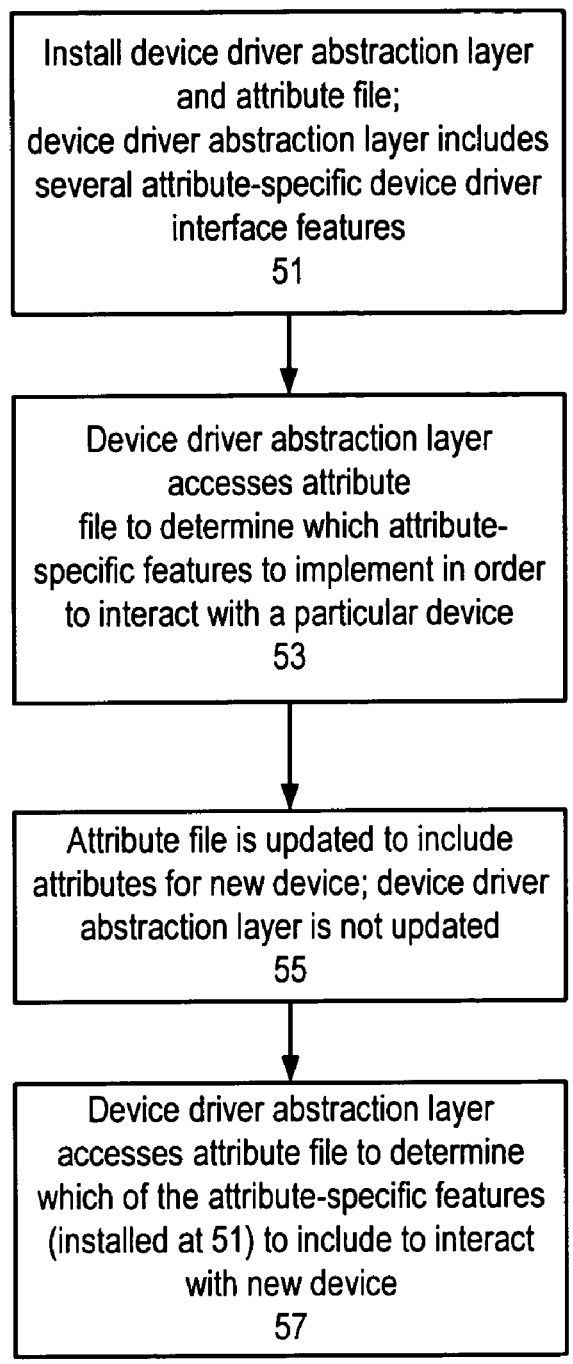
FIG. 5 is a flowchart of a method of using external attribute information to configure device driver interfaces in a device driver abstraction layer, according to one embodiment.

FIG. 5 is a flowchart of a method of using external attribute information to configure device driver interfaces in a device driver abstraction layer, according to one embodiment. At 51, a device driver abstraction layer and external attribute information may be installed in a computer system. Installing the device driver abstraction layer may involve storing one or more compiled executables on the computer system. Installing the external attribute information may involve storing a file (e.g., a text file) in memory within the computer system. The device driver abstraction layer includes several attribute-specific features that the device driver abstraction layer may include in an interface to a device driver in order to interact with a particular device. The attribute information may associate each of several keys that identify different devices with a respective set of attributes.

At 53, the device driver abstraction layer accesses the attribute information to determine which attribute-specific features to implement when configuring a device driver interface to interact with a particular device. Each attribute associated with the device in the attribute information may be used to independently configure a feature of the device driver interface.

At 55, the attribute information may be updated to include an association between a new key, which identifies a newly released device, with a set of attributes. The device driver abstraction layer may not be updated in response to the release of the new device. A device driver interface feature supporting each of the attributes associated with the new device's key in the attribute information may already be included in the device driver abstraction layer, as installed at 51.

The device driver abstraction layer may access the attribute file to determine how to configure a device driver interface for use in communicating with the new device, as indicated at 57. Based on the attributes associated with the new device's key in the attribute information, the device driver abstraction layer may configure an interface to a device driver that includes the appropriate attribute-specific interface features. Thus, by updating the attribute information to include attribute information for the new device, the device driver abstraction layer may support the new device without having to update the device driver abstraction layer source code.

Figure 6:
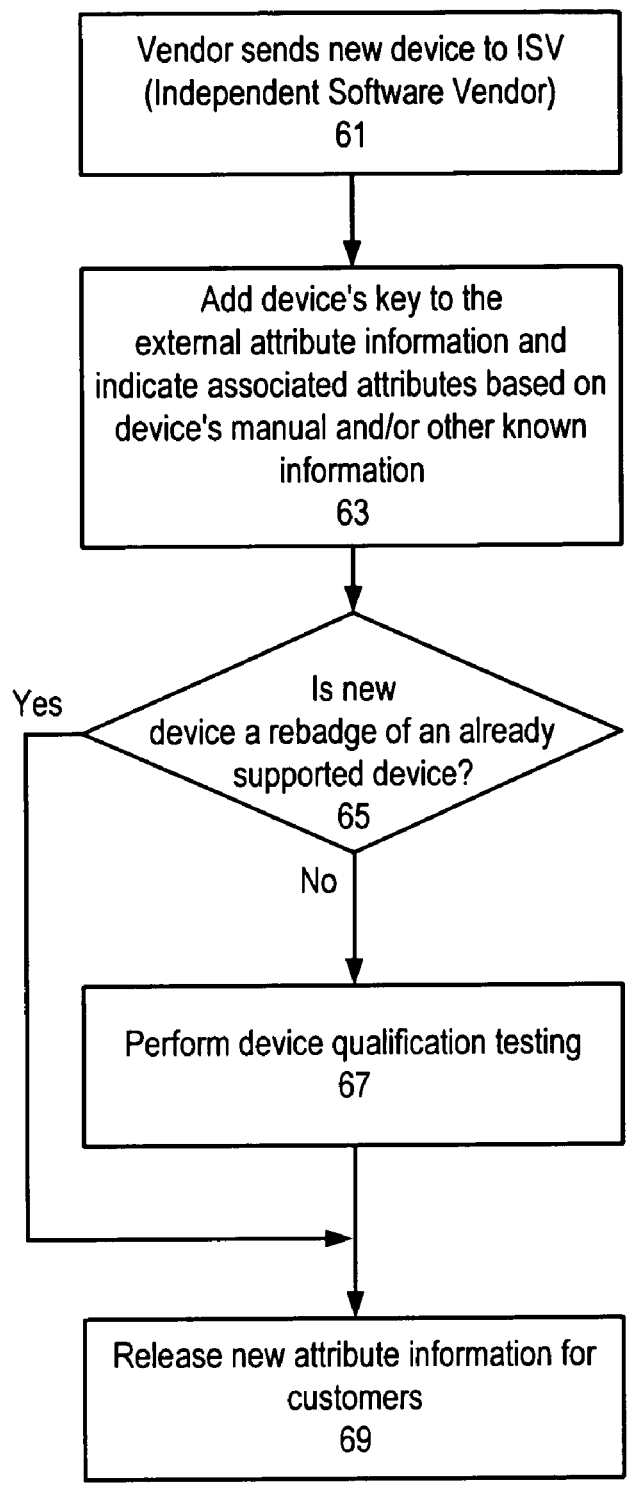
FIG. 6 illustrates a process by which an ISV may provide support for a new device in a system using external attribute information to configure device driver interfaces in a device driver abstraction layer, according to one embodiment.

FIG. 6 illustrates a process by which an ISV may provide support for a new device in a system using external attribute information to configure device driver interfaces in a device driver abstraction layer, according to one embodiment. At 61, a vendor sends a new device to an ISV. At 63, the ISV adds the new device's key to the attribute information and indicates which attributes are associated with that device based on information such as that included in the device's operating manual or datasheet and/or any other known information. If the device is a rebadge of an already supported device and does not include any differing features not already provided by the already supported device, the updated attribute information may be immediately released to customers, as shown at 65 and 69. The updated attribute information may be released by posting one or more files to the ISV's website.

If the device is not a rebadge of an already-supported device, device qualification testing may be performed, using the existing device driver abstraction layer and the attribute information updated at 63, to determine whether the selected attributes are associated with the appropriate device driver interface features needed for the device driver abstraction layer to communicate with the new device, as indicated at 65–67. When the device qualification testing passes, the updated attribute information may be released to the ISV's customers.

Figure 1:
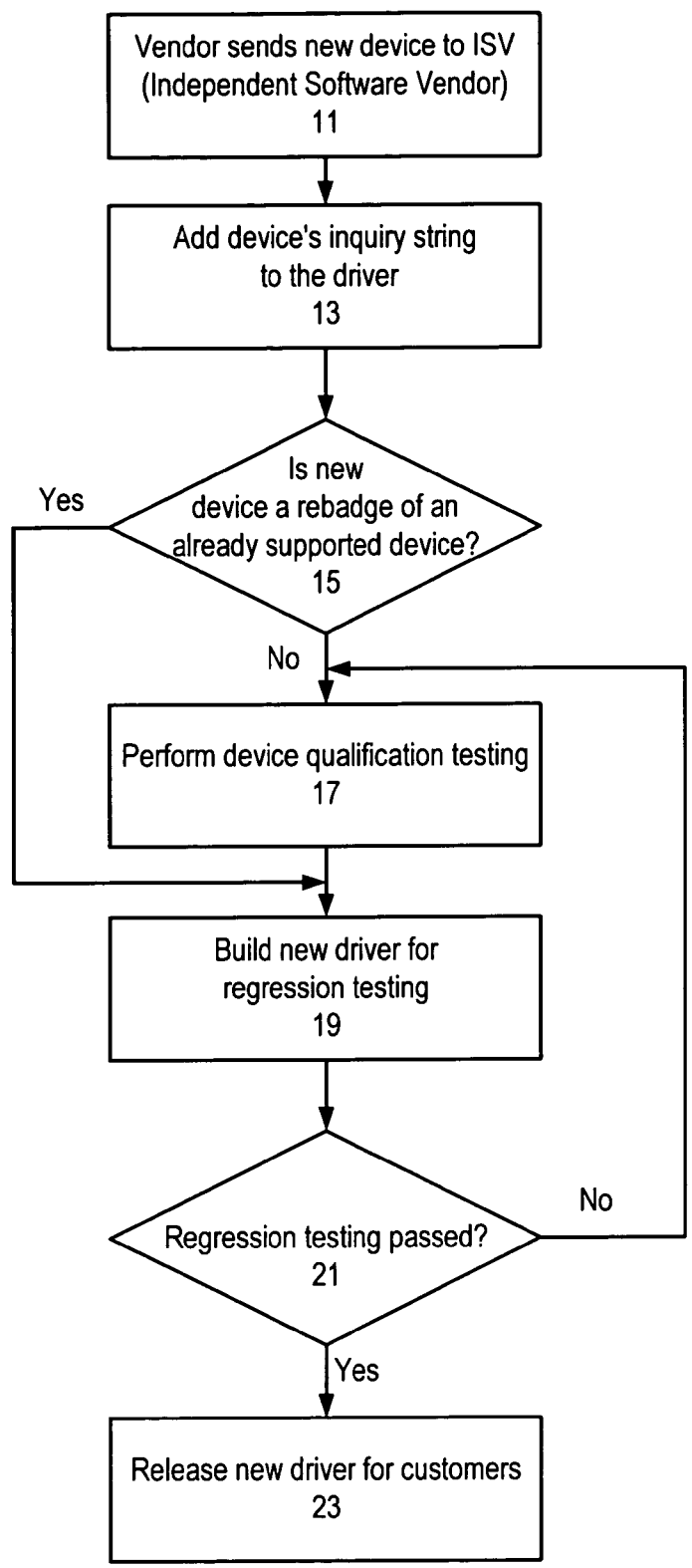
FIG. 1 illustrates the process by which an ISV typically provides support for a new device.

Comparing FIG. 6 to FIG. 1, it is noted that, in at least some situations and some embodiments, the use of external attribute information may allow ISVs to provide support for new devices more quickly and/or with fewer resources than has previously been available. For example, in some embodiments, if a new device has a unique set of already-supported attributes, the new device may be supported by the device driver abstraction layer by simply updating the external attribute information. The device driver abstraction layer source code may not need to be updated, retested, and recompiled in order to provide support for that device, even if no other already-supported device has the same set of attributes.

Returning to FIG. 2, it is noted that a computer system 100 may take various forms, including a workstation, server, mainframe computer system, network appliance, network computer, Internet appliance, personal digital assistant (PDA), embedded device, smart phone, television system, another suitable device, or combinations thereof.

Additionally, note that all or part of a application 122, device driver abstraction layer 124, attribute information 130, and/or device drivers 126 may be stored on various computer accessible media such as memory 120. Examples of computer accessible media include hard disk storage, floppy disk storage, removable disk storage, Flash memory, MEMS (Micro Electro Mechanical Systems) memory, punch cards, magnetic core, and random access memory (RAM). Computer accessible media may include an installation medium, e.g., a CD-ROM or floppy disk. In addition, a computer accessible medium may be included in one computer system that provides the program instructions over a network to another computer system for execution. Thus, various embodiments may further include receiving, sending or storing instructions and/or data implemented in accordance with the foregoing description upon a computer accessible medium. A computer accessible medium may include a communication medium such as network and/or a wireless link on which communication signals such as electrical, electromagnetic, optical, or digital signals are conveyed.

The flow charts described herein represent exemplary embodiments of methods. The methods may be implemented in software, hardware, or a combination thereof. The order of the method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
   accessing attribute information associating each of a plurality of keys with a respective plurality of device attributes, wherein each of the plurality of keys identifies a respective device;
   configuring an interface to a device driver for communication with a device dependent on which device attributes the attribute information associates with one of the plurality of keys, wherein the one of the plurality of keys identifies the device;
   wherein said configuring configures the interface to include one or more of a plurality of interface features, wherein each of the plurality of interface features supports a respective device attribute;
   updating the attribute information to include a new key identifying a new device and to associate one or more device attributes with the new key, wherein the plurality of interface features is not updated by said updating; and configuring an interface to a device driver for communication with the new device dependent on which device attributes the attribute information associates with the new key, wherein the interface to the device driver includes one or more of the plurality of interface features.

2. The method of claim 1, wherein the information associating each of the plurality of keys with a respective plurality of device attributes is stored in one or more files.

3. The method of claim 1, wherein device attributes include one or more of:
an attribute indicating a number of slots included in an associated device, an attribute indicating whether an associated device is configured as a self-cleaning device, and an attribute indicating whether an associated device includes a barcode reader.

4. The method of claim 1, wherein the information is organized as a table.

5. The method of claim 1, wherein the key includes an inquiry string identifying a vendor ID and a product ID.

6. A method, comprising:
storing on a computer system an attribute file indicating which one or more of a plurality of device attributes is associated with each of a plurality of keys, wherein each of the plurality of keys identifies a respective device;
a device driver abstraction layer included in the computer system configuring an interface to a device driver for a device dependent on which of the plurality of device attributes is associated with one of the plurality of keys in the attribute file, wherein the one of the plurality of keys identifies the device;
updating the attribute file to indicate which one or more of the plurality of device attributes is associated with a new key identifying a new device, wherein the device driver abstraction layer is not updated in response to the new device;
the device driver abstraction layer configuring an interface to a device driver for the new device dependent on which of the plurality of device attributes are associated with the new key in the attribute file.

7. The method of claim 6, wherein the device driver abstraction layer includes a plurality of interface features, wherein said configuring an interface to a device driver for a device comprises selecting one or more of the plurality of interface features to include in the interface dependent on which of the plurality of device attributes are associated with the one of the plurality of keys.

8. A computer accessible storage medium comprising program instructions executable to implement a device driver abstraction layer, wherein the device driver abstraction layer is configured to:
access an attribute file, wherein the attribute file associates each of a plurality of keys with a respective plurality of device attributes, wherein each of the plurality of keys identifies a respective device;
configure an interface to a device driver for a device dependent on which attributes are associated with a key identifying the device in the attribute file, wherein the configured interface includes a respective interface feature for each attribute of the plurality of attributes associated with the key in the attribute file;
in response to the attribute file being updated to include a new key identifying a new device and to associate one or more device attributes with the new key; and
configure an interface to a device driver for communication with the new device dependent on which device attributes the attribute file associates with the new key.

9. The computer accessible storage medium of claim 8, wherein device attributes include one or more of: an attribute indicating a number of slots included in an associated device, an attribute indicating whether an associated device is configured as a self-cleaning device, and an attribute indicating whether an associated device is configured to read barcodes.

10. The computer accessible storage medium of claim 8, wherein the key includes an inquiry string identifying a vendor ID and a product ID.

11. A system, comprising:
a device;
a device driver abstraction layer;
an attribute file; and
a device driver for the device;
wherein the device driver abstraction layer is operable to receive a request to access the device and to responsively configure an interface to the device driver for the device;
wherein the device driver abstraction layer is operable to configure the interface to the device driver dependent on which attributes are associated with a key identifying the device in the attribute file;
wherein the device driver abstraction layer is operable to configure the interface to include a respective interface feature for each attribute of the plurality of attributes associated with the key in the attribute file;
wherein the device driver abstraction layer is further operable, in response to the attribute file being updated, to include a new key identifying a new device and to associate one or more device attributes with the new key; and
wherein the device driver abstraction layer is further operable to configure an interface to a device driver for the new device dependent on which device attributes are associated with the new key in the attribute file, wherein the device driver abstraction layer is not updated in response to the new device.

* * * * *